United States Patent [19]

Uehara et al.

[11] Patent Number: 5,202,611
[45] Date of Patent: Apr. 13, 1993

[54] SYNCHRONIZATION CONTROL SYSTEM FOR SERVO MOTORS

[75] Inventors: Shinichiro Uehara, Higashimurayama; Yasuhiro Yuasa, Fuchu, both of Japan

[73] Assignee: Kabushiki Kaisha SG, Tokyo, Japan

[21] Appl. No.: 565,268

[22] Filed: Aug. 9, 1990

[30] Foreign Application Priority Data

Aug. 24, 1989 [JP] Japan .................................. 1-216136

[51] Int. Cl.⁵ .............................................. H02P 5/46
[52] U.S. Cl. ........................................ 318/85; 318/41; 318/112; 318/590
[58] Field of Search ..................... 318/41, 44, 45–46, 318/47, 49, 51, 73–74, 85, 112, 569, 590–595, 66–68

[56] References Cited

U.S. PATENT DOCUMENTS

| | | | |
|---|---|---|---|
| 4,289,997 | 9/1981 | Jung et al. | 318/89 X |
| 4,376,913 | 3/1983 | Higby | 318/85 |
| 4,565,950 | 1/1986 | Kikouno | 318/85 |
| 4,815,013 | 3/1989 | Schmidt | 318/85 X |
| 4,988,937 | 1/1991 | Yoneda et al. | 318/675 |

*Primary Examiner*—William M. Shoop, Jr.
*Assistant Examiner*—David Martin
*Attorney, Agent, or Firm*—Graham & James

[57] ABSTRACT

There are provided servo motors and servo control units for n shafts. A setting device previously sets parameters for servo control individually for each of the n shafts and previously sets parameters for servo control for a synchronizing operation. Data which determines synchronization conditions of servo motors of respective shafts is applied, when required, by an input device independently of setting by the setting device. The data which determines the synchronization conditions includes, for example, data of combination of synchronized shafts and data of section for synchronization. A moving pattern preparation device determines servo motor shafts to be synchronously controlled on the basis of the synchronization condition determining data applied through the input device and prepares a moving pattern to a target position on the basis of the parameters for servo control set by the setting device with respect to each servo motor shaft to be synchronously controlled. Positioning control data corresponding to the prepared moving pattern is supplied to the servo control unit corresponding to each shaft to synchronously control the servo motor corresponding to each shaft. The synchronization conditions can be changed, when required, by the input device.

6 Claims, 4 Drawing Sheets

SYNCHRONIZATION CONTROL SYSTEM FOR SERVO MOTORS

BACKGROUND OF THE INVENTION

This invention relates to a synchronization control system for plural-shaft servo motors and, more particularly, to a synchronization control system capable of changing synchronization conditions as desired even during driving.

Among industrial machines incorporating a servo control system such as a robot, there is one which controls an operation of an object of control by a cooperative movement of plural shafts. For example, a double-shaft servo control is employed for moving a single object of control (e.g., an arm of a robot) two-dimensionally and a triple-shaft servo control is employed for moving it three-dimentionally. For winding an article unwound from a supply roll on a take-up roll, a double shaft servo control is made with the take-up roll and the supply roll. There are also numerous other examples among control systems of industry machines or other machines which perform a servo control of plural shafts synchronously or asynchronously.

In prior art synchronization control systems for plural-shaft servo motors, desired contents for control parameters of the following items are programmed beforehand by manual inputting or teaching, and driving of the servo motor is effected on the basis of this program:

(1) Combination of servo motor shafts which become an object of a synchronized driving.

(2) Type of interpolation defining a locus of the object of control from one set position to a next set position (e.g., linear interpolation or arc interpolation).

(3) Acceleration or deceleration time of the object of control moved by the synchronization control of plural shafts (i.e., acceleration or deceleration time relating to a resultant composite vector of plural shafts which are synchronously controlled).

(4) Moving speed at a constant speed of the object of control moved by the synchronization control of plural shafts (i.e., moving speed at a constant speed of a resultant composite vector of plural shafts which are synchronously controlled).

In the above described synchronization control system according to the program, the start point or passing point or end point of movement is used as a step of programming and, therefore, it is not possible to change contents of the program at a desired moving position during actual driving of the servo motor. When, for example, an object of control is moved by cooperation of plural shafts, these plural shafts need not always be synchronously controlled, but, in some cases, they may only need to be synchronously controlled in a desired necessary section. In such case, the prior art system is inconvenient in that contents of synchronizing or non-synchronizing program cannot be changed at desired position. Not only in such case but in others, such inconvenience tends to make the prior art system inflexible, and, therefore, improvement has been desired.

SUMMARY OF THE INVENTION

It is, therefore, an object of the invention to provide a synchronization control system for servo motors in which various parameter information such as combination of servo motor shafts used for the synchronization control and synchronized section can be applied not by a program but from outside on a real time basis and synchronization conditions thereby can be changed at any desired moving position.

The synchronization control system for servo motors achieving the above described object of the invention comprises servo motors and servo control units for n shafts, an input device for receiving, when required, data which determines synchronization conditions of the servo motors of the respective shafts, a setting device for previously setting parameters for servo control individually for the respective shafts and previously setting parameters for servo control for a synchronizing operation, and a moving pattern preparation device for determining servo motor shafts to be synchronously controlled on the basis of the synchronization condition determining data applied through the input device and preparing a moving pattern for synchronization on the basis of the parameters for servo control with respect to each servo motor shaft to be synchronously controlled, positioning command data corresponding to the prepared moving pattern being supplied to the servo control unit corresponding to each shaft thereby to synchronously control the servo motor corresponding to each shaft.

The setting device previously sets parameters for servo control individually for the respective shafts and previously sets parameters for servo control for a synchronizing operation. By this setting, respective servo control conditions are programmed. Data which determines synchronization conditions of servo motors of respective shafts are applied, when required, by the input device independently of the setting by the setting device. The moving pattern preparation device determines servo motor shafts to be synchronously controlled on the basis of the synchronization condition determining data applied through the input device and prepares a moving pattern to a target position on the basis of the parameters for servo control with respect to each servo motor shaft to be synchronously controlled.

In this manner, when the synchronization conditions have been changed on the basis of the synchronization condition determining data applied through the input device, a new moving pattern corresponding to the changed synchronization conditions is prepared and servo control of the respective shafts is performed in accordance with the new moving pattern. Accordingly, the synchronization conditions can be changed at any desired moving position.

In one aspect of the invention, the synchronization condition determining data applied through the input device consists of combination setting data for determining, with respect to m combinations, one or more shafts of the combinations and synchronization/non-synchronization command data commanding a synchronization operation or non-synchronization operation for each combination. In this case, the moving pattern preparation device prepares, with respect to a combination which has been switched from the non-synchronizing operation to the synchronizing operation on the basis of the combination setting data and the synchronization/non-synchronization command data applied through the input device, a new moving pattern for synchronization for each servo motor shaft belonging to this combination concerning the remaining moving pattern after the time point of switching in accordance with the parameters for servo control set by the setting device.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
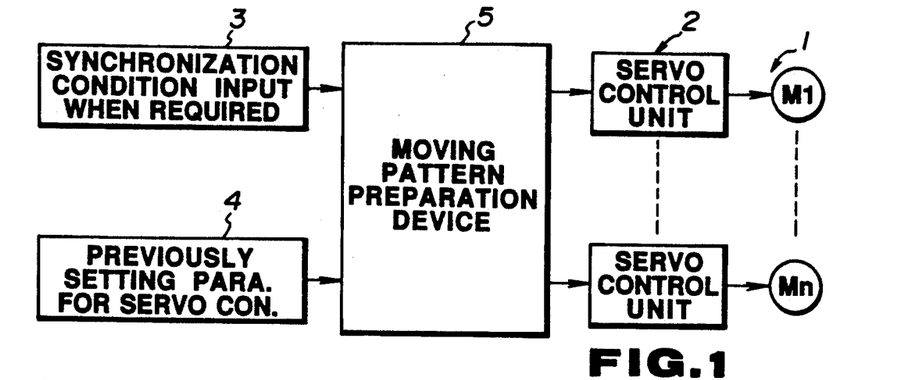
FIG. 1 is a functional block diagram showing an example of the basic construction of the synchronization control system for a servo motor according to the invention.

Referring to FIG. 1, a synchronization control system of a servo motor comprises servo motors 1 and servo control units 2 for n shafts and synchronously controls a combination of desired servo motors among these servo motors 1. A setting device 4 previously sets parameters for servo control individually for each of the n shafts and previously sets parameters for servo control for a synchronizing operation. Servo control conditions are programmed by this setting. Data which determines synchronization conditions of servo motors of respective shafts is applied, when required, by an input device 1 independently of setting by the setting device 4. The synchronization condition determining data includes, for example, data of combination of synchronized shafts and data of section for synchronization. A moving pattern preparation device 5 determines servo motor shafts to be synchronously controlled on the basis of the synchronization condition determining data applied through the input device 3 and prepares a moving pattern to a target position on the basis of the parameters for servo control with respect to each servo motor shaft to be synchronously controlled. Positioning command data corresponding to the prepared moving pattern is supplied to the servo control unit 2 corresponding to each shaft thereby to synchronously control the servo motor 1 corresponding to each shaft.

In this manner, when the synchronization conditions have been changed on the basis of the synchronization condition determining data applied through the input device 3, a new moving patern corresponding to the changed synchronization conditions is prepared and servo control of the respective shafts is performed in accordance with the new moving pattern. Accordingly, the synchronization conditions can be changed at any desired moving position.

Figure 2:
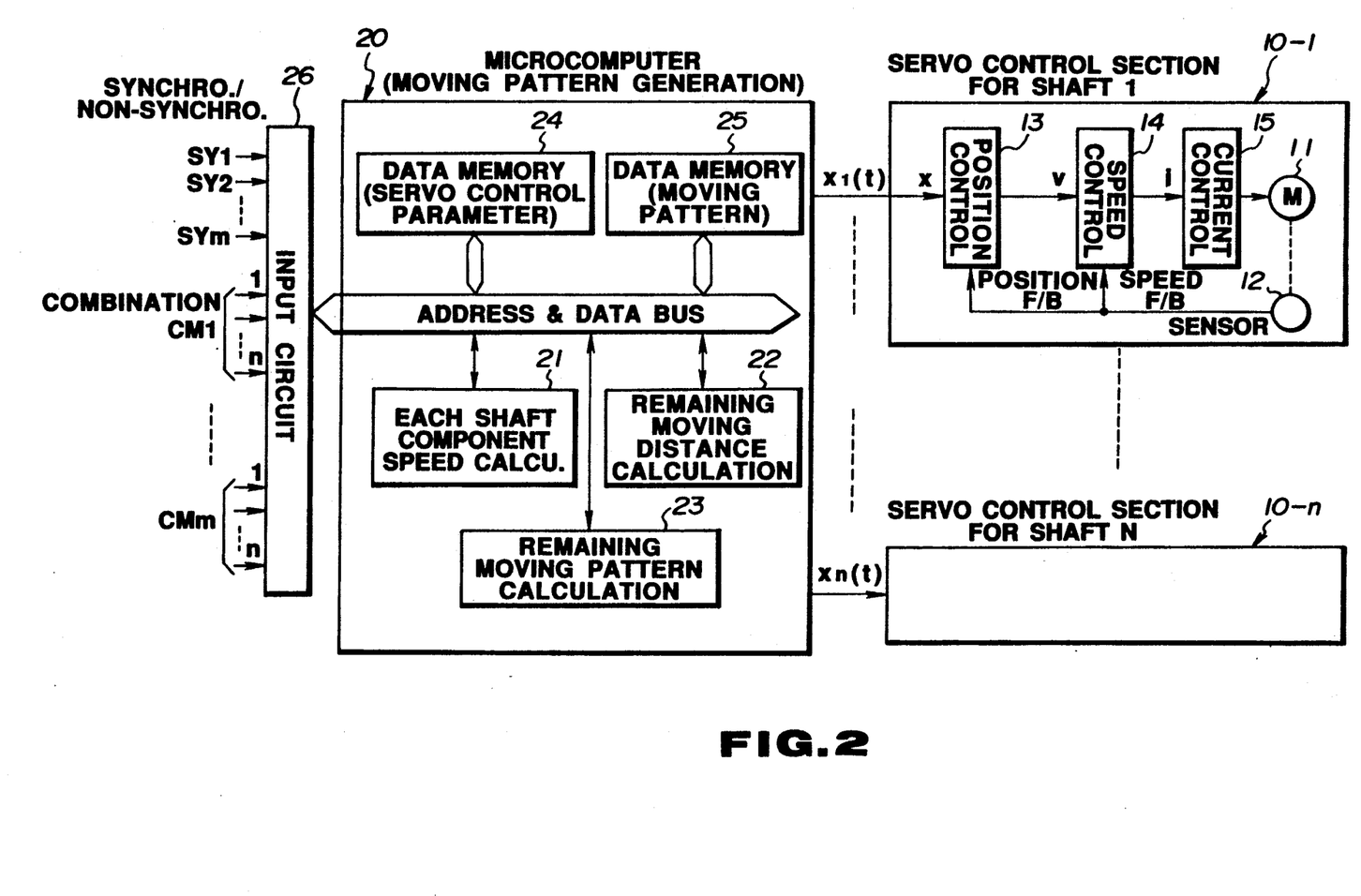
FIG. 2 is a block diagram showing a hardware construction of a specific embodiment of the synchronization control system of a servo motor according to the invention.

With reference to FIG. 2, a specific embodiment of the invention will be described below.

In FIG. 2, servo control sections 10-1 to 10-n for n shafts may be of a known construction which includes a servo motor 11 and a servo control unit. In this case, the servo control unit includes a sensor 12 for detecting a rotational position and a speed of rotation of the servo motor 11, a position control circuit 13 responsive to a command value x and position feedback data from the sensor 12 for providing control data v corresponding to deviation in position, a speed control circuit 14 responsive to this data v and speed feedback data from the sensor 12 for providing control data i corresponding to deviation in speed, and a current control circuit 15 for controlling drive current of the servo motor 11 in response to this data i.

The command value x to each shaft is generated by a microcomputer 20 which is constructed to function as a moving pattern generation device. For example, the command value x is provided by the microcomputer 20 as data x(t) (distinguished for each shaft by x1(t) to xn(t)) which indicates a moving position for unit time Δt (i.e., absolute value of a moving position at each moment). The microcomputer 20 includes, as is well known, hardware circuits such as a central processing unit (CPU), a program memory and a working memory. In FIG. 2, however, illustration of these hardware circuits is omitted. Blocks designated as each shaft component speed calculation section 21, remaining distance calculation section 22 and remaining moving pattern calculation section are functional blocks showing a part of processing function of the microcomputer 20. Data memories 24 and 25 store various data relating to servo control. The first data memory 24 stores parameter data for determining servo control conditions and the second data memory 25 stores remaining moving pattern of each shaft calculated by the remaining moving pattern calculation section 23.

The parameter data for determining servo control conditions stored in the first data memory 24 include, for example, (1) type of interpolation function defining a locus of an object of control from a certain set position to a next set position (e.g., linear interpolation or arc interpolation)

(2) parameter data setting individual servo control conditions for each servo motor shaft (hereinafter referred to as "single shaft parameters") such as data of acceleration time, deceleration time, constant speed, start position, stop position, other desired position and constants of the servo control section (3) parameter data setting servo control conditions for each of the combinations of servo motor shafts which is an object of synchronization control (hereinafter referred to as "shaft-synchronizing parameter") such as data of acceleration time during the synchronizing operation, deceleration time during the synchronizing operation and resultant moving speed during the synchronizing operation.

These parameters may be programmed by a suitable method and then stored in the data memory 24. For example, these parameters may be set and input with desired contents (i.e., programmed) by a setting and inputting means such as a keyboard and stored in the data memory 24. Alternatively, these parameters may be programmed with desired contents by an unillustrated separate program means and stored in the data memory 24 by an on-line or off-line data transfer. The first data memory 24 may either be a RAM or a ROM.

An input circuit 26 is provided for receiving, when required, combination setting data CM1 to CMm for determining, with respect to m combinations, one or more shafts of the combinations and synchronization/non-synchronization command data SY1 to SYm from outside. In other words, these combination setting data CM1 to CMm and the synchronization/non-synchronization command data SY1 to SYm (i.e., data for setting synchronization conditions of the servo motor of each shaft) are not previously set (programmed) in the first data memory 24 as the other parameters for servo control but are applied, when required, from outside through the input circuit 26.

The combination setting data CM1 to CMm respectively consist of an n-bit signal with each bit thereof corresponding to one of the n servo motors. A bit in the data corresponding to a servo motor shaft belonging to the particular combination becomes "1". The synchronization/non-synchronization command data SY1 to SYm respectively consist of a one-bit signal which becomes "1" with respect to a combination to which the synchronizing operation is given.

These combination setting data CM1 to CMm and the synchronization/non-synchronization command data SY1 to SYm may be set and input, when required, by suitable means such as an unillustrated switch or, alternatively, may be input on-line from a suitable exterior device such as a sequencer which is a host device.

In the microcomputer 20, contents of the combination setting data CM1 to CMm supplied to the input circuit 26 and the synchronization/non-synchronization command data SY1 to SYm are constantly scanned and stored, and presence or absence of change in the contents is detected.

Figure 3:
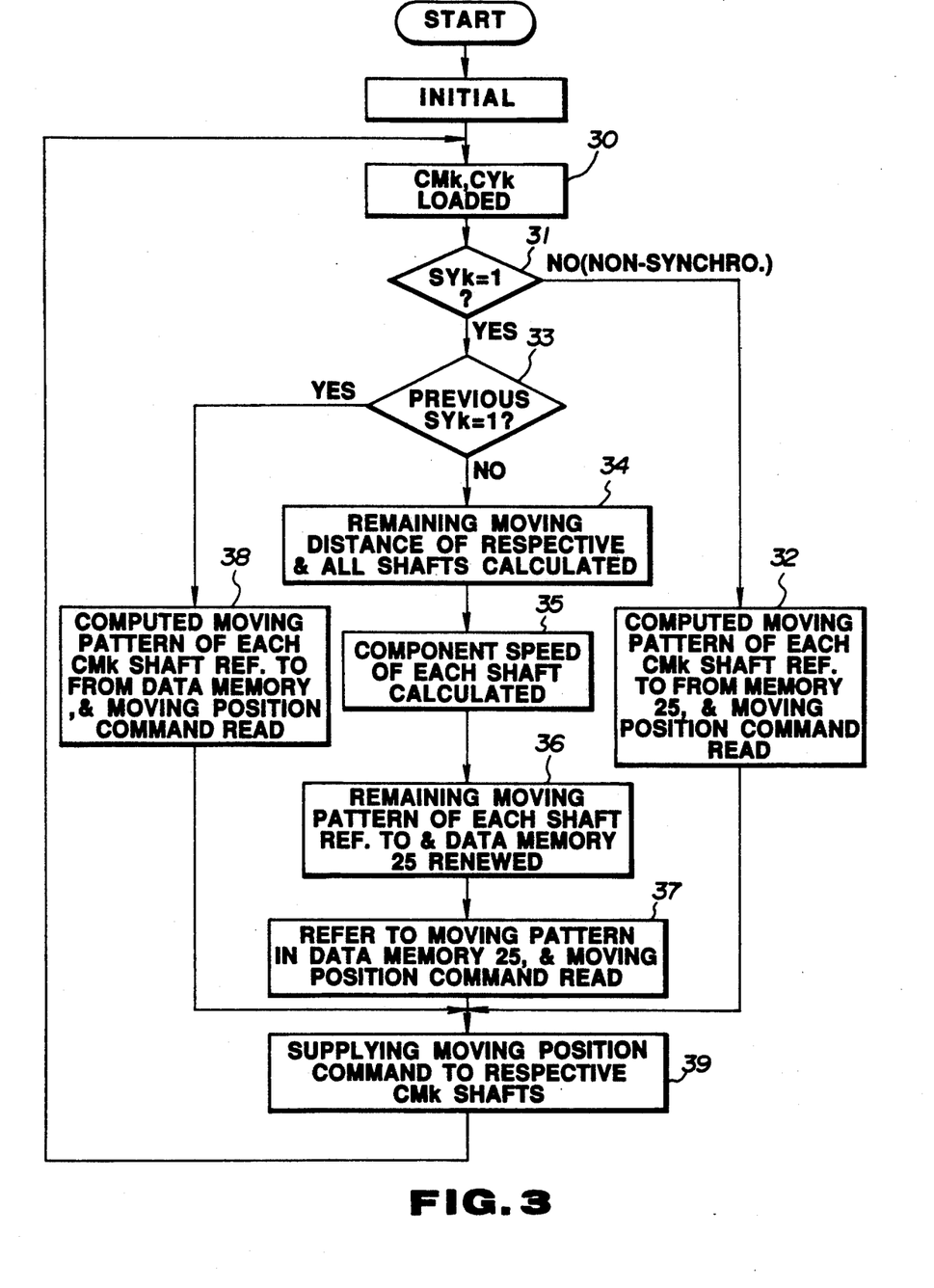
FIG. 3 is a flow chart showing an example of processing executed by the microcomputer in FIG. 2.

An example of contents of processing in the microcomputer 20 is shown in FIG. 3. FIG. 3 shows a processing concerning a single combination (the number of this combination is designated by k). A processing similar to the one shown in FIG. 3 is executed on a time shared basis or in parallel with respect to each of the m combinations.

In the initial processing, a necessary initial setting is executed. For example, an initial moving pattern of each shaft is obtained and stored in the second data memory 25. By way of example, on the assumption that all shafts are initially not synchronized, a moving pattern from a start position to a stop position is computed on the basis of the single shaft parameters which have been set in the first data memory 24 and this moving pattern is stored in the second data memory 25. The initial setting of course is not limited to this but a suitable combination of synchronization/non-synchronization may be set even in an initial period.

Then, the combination setting data CMk and the synchronization/non-synchronization command data SYk concerning the k-th combination are loaded from the input circuit 26 (step 30).

In the next step, whether the loaded synchronization/non-synchronization command data SYk is "1" or not, i.e., whether the synchronizing operation has been designated or not, is examined (step 31). If result of examination is NO, the computed moving pattern concerning the servo motor shaft belonging to the particular combination is referred to from the second data memory 25 on the basis of the combination setting data CMk and read out at one address unit (per unit time) (step 32).

If step 31 is YES, the routine proceeds to step 33 in which whether or not the synchronization/non-synchronization command data SYk in the preceding cycle was "1" is examined. If result of examination is NO, it will be meant that the operation mode has changed from non-synchronization to synchronization and processing of steps 34 to 37 is executed. If result of examination is YES, it will be meant that the synchronized state continues and the routine proceeds to step 38.

Step 38 is a similar processing to step 32. In step 38, the computed moving pattern concerning the servo motor shaft belonging to the particular combination is referred to from the second data memory 25 on the basis of the combination setting data CMk and read out at one address unit (per unit time).

In steps 34 to 36, servo motor shafts which should be synchronously controlled are determined in accordance with the combination setting data CMk and, with respect to these shafts, a moving pattern to a target position (stop position) is prepared on the basis of the parameter data for servo control which have been set in the first data memory 24.

First, in step 34, remaining moving distance of the respective shafts belonging to the combination and resultant remaining moving distance of these shafts are calculated. More specifically, the remaining moving distance of the respective shafts and resultant remaining moving distance of these shafts are calculated in the following steps:

First, in calculating the remaining moving distance of a certain shaft, the following data among the single shaft parameters of this shaft are used:
    acceleration time setting data Ta1
    deceleration time setting data Td1
    constant speed setting data Vc1
    moving distance setting data Lt1

The suffix "1" in the reference characters designating the above setting data is used for distinguishing the shaft number. The number of shaft about which the remaining moving distance is to be calculated is made 1 in this instance. These single shaft parameters concerning this particular shaft can be obtained by referring to the first data memory 24. The moving distance setting data Lt1 corresponds to the moving distance between the set start position to the set stop position.

Figure 4:
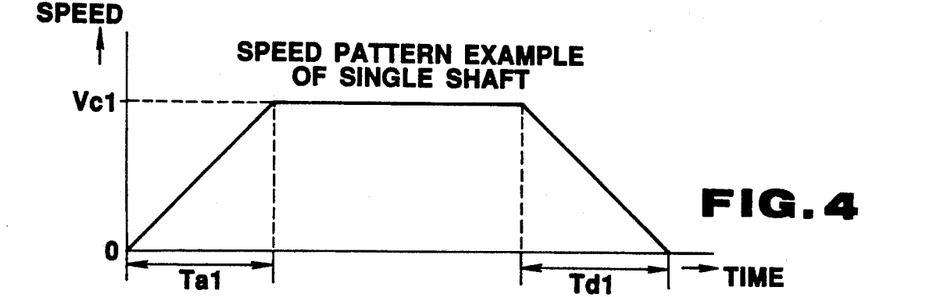
FIG. 4 is a graph showing a typical example of speed pattern (moving pattern) of a s single shaft.

By way of example, the speed pattern of the single shaft is assumed to be one shown in FIG. 4. This speed pattern is determined by the above single shaft parameters Ta1, Td1 and Vc1.

In calculating the remaining moving distance, data Ts representing time at which the synchronization command has been given (time at which the operation mode has been switched from non-synchronization to synchronization) is used in addition to the single shaft parameters Ta1, Td1, Vc1 and Lt1. In this embodiment, starting time of this data Ts is determined as follows depending upon whether the section at which the synchronization command has been given (i.e., the section in which the operation mode has been switched from non-synchronization to synchronization) is the acceleration section, constant speed section or the deceleration section:

In the acceleration section, a time point at which moving starts.
    In the constant speed section, a time point at which acceleration ends.
    In the deceleration section, a time point at whcih deceleration starts.

Remaining moving distance Lt1 of the particular shaft is calculated in the following manner by utilizing the single shaft parameters Ta1, Td1, Vc1 and Lt1 and the time variation data Ts depending upon whether the section in which the synchronization command has been given (the section in which the operation mode has been switched from non-synchronization to synchronization) is the acceleration section, costant speed section or deceleration section:

(1) In a case where the synchronization command has been given in the acceleration section $$Lt1' = Lt1 - Ts/Ta1 \times Vc1 \times Ts \times 0.5$$

(2) In a case where the synchronization command has been given in the constant speed section $$Lt1' = Lt1 - Vc1 \times Ta1 \times 0.5 - Vc1 \times Ts$$

(3) In a case where the synchronization command has been given in the deceleration section $$Lt1' = Lt1 - Vc1 \times Ta1 \times 0.5 - Vc1 \times Tc - (2Td1 - Ts)/Td1 \times Vc1 \times Ts \times 0.5$$

In the above equations, Tc represents time elapsed in the constant speed section. The value of the time data Ts at the end of the constant speed section may be stored in a suitable manner as the time Tc.

The above equations obtain the remaining moving distance Lt1' by calculating the amount which the particular shaft has already moved by integration of the speed and subtracting this amount from the total predetermined amount of moving Lt1.

In the foregoing manner, the remaining moving distance Lt1' of each shaft belonging to the particular combination is calculated. Then, resultant moving distance LtS' of the remaining moving distances Lt1', ... of the respective shafts of the particular combination is calculated by the following equation:

$$LtS' = \sqrt{(Lt1')+(Lt2')+\ldots}$$

In the above equation, Lt2', for example, represents remaining moving distance of the shaft number 2 and the equation is expressed on the assumption that the shafts of the shaft numbers 1 and 2 and other suitable shafts belong to the same combination.

In next step 35, component moving speed of each shaft of the combination is calculated. More particularly, the component moving speed is calculated by processing described below.

In calculating a component moving speed of a certain combination, the data memory 24 is referred to and resultant moving speed setting data VcS during synchronization among the synchronized shaft parameters of the particular combination is used. This resultant moving speed during synchronization represents a resultant constant moving speed when the respective shafts of the combination perform the synchronizing operation.

The component moving speed VcS1 of each shaft of the combination is calculated by the following equation on the basis of the remaining moving distance Lt1', the resultant moving distance LtS' and the resultant moving speed setting data VcS calculated in the preceding step. In the same manner as previously described, the suffix represents the shaft number and VcS1 the component moving speed of the shaft number 1:

$$VcS1 = Lt1'/LtS' \times VcS$$

Nextly, in step 36, the remaining moving pattern of each shaft of the combination is prepared on the basis of the remaining moving distance Lt1' ... and the component moving speed VcS1 ... of each shaft. More specifically, the remaining moving pattern is prepared by a processing described below.

In preparing a remaining moving pattern of each shaft of a certain combination, the following parameters among shaft-synchronizing parameters of the combination are used in addition to the remaining moving distance Lt1' ... and the component moving speed VcS1 ... of each shaft obtained in the preceding step by referring to the data memory 24:

Acceleration time setting data TaS during the synchronizing operation

Deceleration time setting data TdS during the synchronizing operation

Figure 5A:
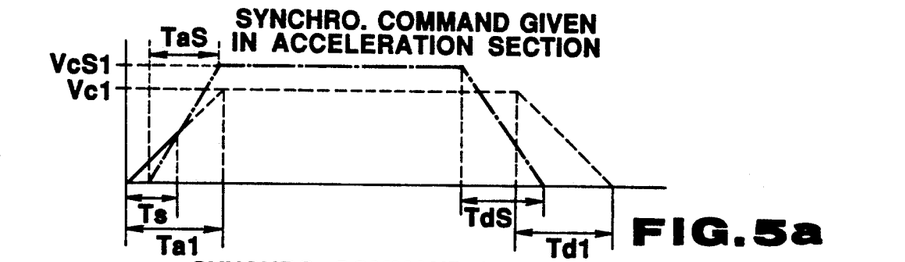
FIGS. 5a to 5c are diagrams showing modes of change in the speed pattern (moving pattern) when the operation mode has been changed from the non-synchronizing operation to the synchronizing operation.
Figure 5B:
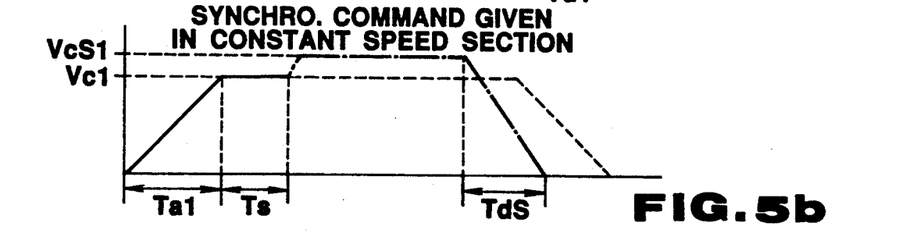
Figure 5C:
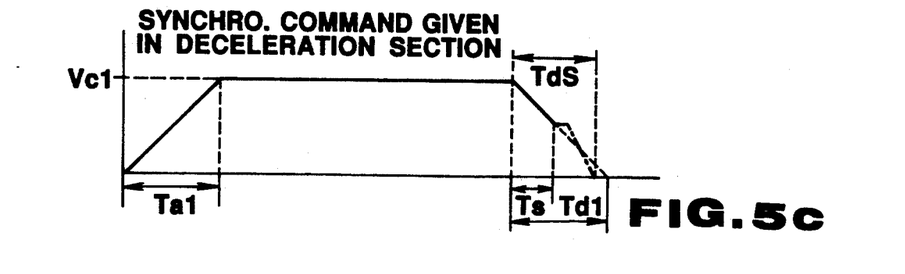

The remaining moving pattern of each shaft is prepared as described below depending upon whether the section in which the synchronization command has been given is the aceleration section, constant speed section or deceleration section. The moving pattern can be basically expressed by the speed pattern. FIGS. 5a to 5c illustrate examples of such speed patterns. In FIGS. 5a to 5c, the pattern consisting of solid lines and broken lines represent initial speed patterns of a single shaft in which the solid lines represent sections which have already moved. Chain-and-dot lines represent speed patterns corresponding to remaining moving patterns prepared by switching to the synchronization command. As will be apparent, the moving pattern (remaining moving pattern) consisting of aggregation of moving position data x(t) for each unit time Δt can be calculated by integration of the speed patterns.

(1) In a case where the synchronization command has been given in the acceleration section A modified example of the pattern in this case is shown in FIG. 5a. The inclination of an acceleration section from speed 0 to component moving speed VcS1 of the particular shaft (i.e., acceleration) is determined by using required time in this acceleration section as acceleration time setting data TaS during synchronization. The inclination consists of a section from the current speed at a time point of switching to the synchronization command to the component moving speed VcS1. The pattern is prepared in such a manner that, in the constant speed section, the speed of the component moving speed VcS1 is maintained and, in the deceleration section, time from the component moving speed VcS1 to speed 0 of the particular shaft becomes the deceleration time setting data TdS during synchronization. The time point of switching from the constant speed section to the deceleration section is calculated properly so that integration of the entire speed pattern becomes the moving distance Lt1. In this manner, the speed pattern shown by the chain-and-dot line in FIG. 5a and a remaining speed pattern based on this speed pattern are prepared and stored in the data memory 25. The speed pattern stored originally in the data memory 25 was the pattern shown by the solid line and the dotted line in FIG. 5a. The pattern has now been changed to one shown by the solid line and the chain-and-dot line in FIG. 5a. As will be apparent, the section of the solid line in the pattern consisting of the solid line and the chain-and-dot line represents the finished moving pattern and the section of the chain-and-dot line represents the remaining moving pattern.

(2) In a case where the synchronization command has been given in the constant speed section.

A modified example of the pattern in this case is shown in FIG. 5b. A partial pattern which changes with a suitable transient characteristic to the component moving speed VcS1 is prepared so that the speed changes quickly and smoothly from the constant speed Vc1 to the component moving speed VcS1 of the particular shaft. Thereafter, the pattern maintains the component moving speed VcS1. In the deceleration section, the pattern is determined so that time from the component moving speed VcS1 of the particular shaft to the speed 0 becomes the time of the deceleration time setting data TdS during synchronization. In this case also, the time point of switching from the constant speed section to the deceleration section is properly calculated so that integration of the entire speed pattern corresponds to the moving distance Lt1. In this manner, the speed pattern shown by the chain-and-dot line in FIG. 5b and a remaining moving pattern based on this speed pattern are prepared and stored in the data memory 25. The moving pattern stored originally in the data memory 25 was the speed pattern shown by the solid line and the dotted line in FIG. 5b. The pattern has now been changed to the one shown in the solid line and the chain-and-dot line. As will be apparent, the section of the solid line in the moving pattern consisting of the solid line and the chain-and-dot line represents the finished moving pattern and the section of the chain-and-dot line represents the remaining moving pattern.

(3) In a case where the synchronization command has been given in the deceleration section.

A modified example of the pattern in this case is shown in FIG. 5c. First, the inclination of the deceleration section (degree of deceleration) is determined so that time from the component moving speed VcS1 of the particular shaft to speed 0 becomes the time of the deceleration time setting data TdS during synchronization and a new pattern is set so that a section from the current speed at a time point of switching to the synchronization command to speed 0 becomes the inclination. In this case, the shape of the new pattern shown by the chain-and-dot line is adjusted suitably so that the area of the dotted line becomes equal to the area of the new pattern shown by the chain-and-dot line.

In this manner, the remaining moving pattern from the current point to the target point is calculated with respect to each shaft of the combination to which the synchronization command has been given.

In next step 37, the new moving pattern of each shaft which has been prepared in the preceding step is stored in the second data memory 25. In other words, the moving pattern stored in the data memory 25 is renewed.

In step 39, the moving position command value x(t) for each shaft of the combination is read from the data memory 25 and supplied to the servo control sections 10-1 to 10-n corresponding to the respective shafts. Thereafter, the routine returns to processing of step 30 at a next scan timing.

The processing from steps 30 to 39 is a processing for one combination and a processing similar to steps 30 to 39 is made on a time shared basis or in parallel with respect to m combinations.

Referring to FIG. 3, an example of the processing will be described. First, at starting, the moving pattern of each shaft which has been initially set by the initial processing is stored in the second data memory 25. When, for example, the initial set state is non-synchronization, the moving pattern prepared on the basis of the single shaft parameters is stored in the second data memory 25. When the synchronization/non-synchronization data SYk loaded from outside in the first scan cycle is "0", i.e., non-synchronization, the moving position data x(t) for each unit time Δ(t) is read in step 32 from the prepared moving pattern stored in the second data memory 25 and this data is supplied to a corresponding one of the servo control sections 10-1 to 10-n as an absolute position command value of the unit time Δ(t).

When the synchronization/non-synchronization command data SYk has been turned to "1" in a certain scan cycle, the routine proceeds to step 33, If it is confirmed in this step that the data SYk was "0" in the preceding scan cycle, processing of steps 34 to 37 is performed, that is, a new moving pattern, i.e., remaining moving pattern, based on the synchronized shaft parameters is prepared and contents of a corresponding moving pattern stored in the second data memory 25 are thereby renewed. Then, the moving position data x(t) for unit time Δ(t) corresponding to the new moving pattern for synchronizing operation is read out and supplied as a command value to a corresponding one of the servo control sections 10-1 to 10-n.

If the synchronization/non-synchronization command data SYk remains to be "1", steps 31 and 33 are both YES and the routine proceeds to step 38. In this step, the renewed moving pattern for synchronizing operation is read from the second data memory 25 and the read out moving position data x(t) for unit time Δ(t) is supplied as a command value to a corresponding one of the servo control sections 10-1 to 10-n. Also, as can be seen in FIG. 3, when the data SYk has been turned from "1" to "0", namely, synchronization to non-synchronization, step 32 is taken from a NO determination in step 31, for reading the renewed moving pattern for synchronization from the second data memory 25 and supplying the moving position data X(t) for each unit time Δ(t) to the corresponding one of the servo control sections 10-1 to 10-n. In other words, the moving pattern for synchronizing operation is directly used. Alternatively, a moving pattern may be prepared again on the basis of the single shaft parameters.

As will be apparent, by setting the synchronization/non-synchronization command data SYk at "1" in accordance with a desired moving section, the section of synchronizing operation can be determined as desired. Besides, change of this section of synchronizing operation can be made freely by changing the synchronization/non-synchronization command data SYk.

Figure 6:
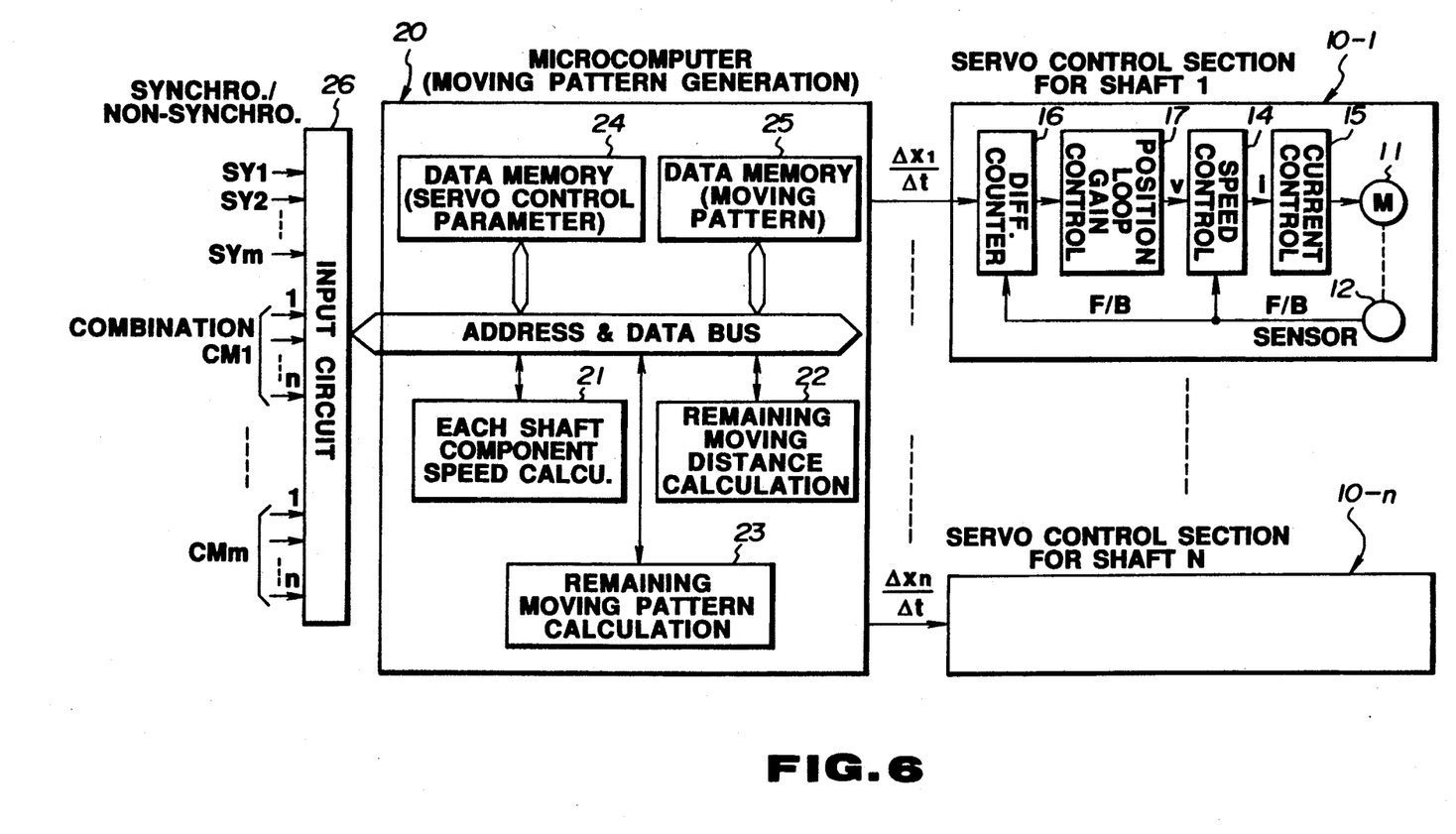
FIG. 6 is a block diagram showing a hardware construction of another embodiment of the synchronization control system of a servo motor according to the invention.

In the above described embodiments, the command value provided by the microcomputer 20 to each shaft is the absolute value x(t) of the moving position for unit time Δt. The command value however is not limited to this but it may be a minute amount of movement Δx. An embodiment utilizing this type of command value is shown in FIG. 6. In this example, an incremental pulse corresponding to a minute amount of movement Δx for unit time Δt (shown as Δx1/Δt to Δxn/Δt for each shaft) is provided as the command value by the microcomputer 20. The servo control sections 10-1 to 10-n of the respective shafts include respectively a difference counter 16 for obtaining a difference between the command pulse train $\Delta x1/\Delta t$ to $\Delta xn/\Delta t$ provided by the microcomputer 20 and a position feedback pulse from a sensor 12 and the output of this difference counter 16 (position difference data) is applied to a speed control circuit 14 through a position loop gain control circuit 17. In the embodiment of FIG. 6, the sensor 12 generates an incremental pulse corresponding to the position whereas in the embodiment of FIG. 2, the sensor 12 generates absolute data of a detected position.

In the above embodiments, the moving pattern is stored in the memory and, when the contents of the synchronization/non-synchronization command data SYk have been changed, the remaining moving pattern is made again and the contents of the moving pattern stored in the memory are renewed by this remaining moving pattern. Alternatively, the moving pattern may be made on real time base by always examining the contents of the synchronization/non-synchronization command data SYk.

The process of preparation of the remaining moving pattern is not limited to the above described embodiments but may be suitably modified as desired.

In the examples of FIGS. 4 and 5, the speed change characteristics in the acceleration and deceleration sections are linear but they may be non-linear characteristics such as a logarithmic function or an exponential function.

The moving pattern preparation means need not necessarily be a microcumputer but may be constructed of an exclusive hardware circuit.

As described in the foregoing, according to the invention, various parameter information such as combinations of servo motors and synchronized section used for synchronizing operation can be supplied not from a program but from outside on a real time base. Synchronization conditions can be changed at a desired moving position and, when the synchronization conditions have been changed, a new moving pattern can be prepared in accordance with the changed synchronization conditions. Accordingly, the synchronizaiton conditions can be changed at a desired moving position and therefore a novel and useful servo motor synchronization control system of a free data (free combination) or free rendezvous (free synchronous driving) type can be provided.

What is claimed is:

1. A synchronization control system for servo motors comprising:
    a plurality of servo motors and servo control units for driving a plurality of shafts;
    input means for providing synchronization data which determines whether any servo motors of the respective shafts are to be synchronously controlled;
    setting means for setting parameters for servo control individually for the shafts; and
    moving pattern preparation means for determining which servo motor shafts are to be synchronously controlled on the basis of the synchronization data provided by said input means and preparing a moving pattern for synchronization on the basis of the parameters for servo control with respect to each servo motor shaft to be synchronously controlled;
    wherein positioning command data corresponding to the prepared moving pattern is supplied to the servo control unit corresponding to each shaft thereby to synchronously control the servo motor corresponding to each shaft.

2. A synchronization control system for servo motors as defined in claim 1 wherein said moving pattern preparation means prepares the moving patten for synchronization with respect to the servo motor shafts to be synchronously controlled in response to changing of the synchronization data.

3. A synchronization control system for servo motors as defined in claim 1 wherein said moving pattern preparation means computes remaining moving distance and component moving speed for each shaft on the basis of the parameters for servo control set by said setting means and prepares the moving pattern for synchronization for each shaft on the basis of the remaining moving distance and the component moving speed.

4. A synchronization control system for servo motors comprising:
    servo motors and servo control units for driving a plurality of shafts;
    input means for providing combination determining data which determines a combination of one or more of the shafts to be controlled from a plurality of various possible shaft combinations and also for providing synchronization/non-synchronization command data that commands a synchronizing operation or a non-synchronizing operation for the respective shafts of the combination;
    setting means for setting parameters for servo control individually for each of the shafts and setting parameters for servo control for a synchronizing operation with respect to each combination for which a synchronized operation has been commanded; and
    moving pattern preparation means for preparing a moving pattern for each servo motor shaft in accordance with the parameters for servo control set by said setting means, said moving pattern preparation means preparing, in response to the combination determining data and the synchronization/non-synchronization command data provided by said input means, a synchronization moving pattern for each servo motor shaft belonging to a combination for which the synchronization operation has been commanded;
    wherein positioning command data corresponding to the prepared moving pattern for synchronization is supplied to the servo control unit corresponding to each of said shafts thereby to synchronously control the servo motor corresponding to said shaft.

5. A synchronization control system for servo motors as defined in claim 4 which further comprises storage means for storing a moving pattern for each of said shafts and in which storage of the moving patterns in said storage means is renewed by the moving patterns of corresponding shafts which have been prepared by said moving pattern preparation means, and positioning command data corresponding to the moving patterns stored in said storage means is supplied to said servo control units corresponding to said shafts thereby to control said servo motor corresponding to each said shafts.

6. A synchronization control system for servo motors comprising:
    a plurality of servo motors and servo control units for driving a plurality of shafts;
    control means for selectively designating whether any of the servo motors are to be synchronized with respect to each other, wherein the control means is operable while the motors are driving their respective shafts;

moving pattern preparation means for preparing a moving pattern, in response to a designation from the control means that certain motors are to be synchronously controlled, with respect to each servo motor shaft to be synchronously controlled, the moving pattern representing servo control to be applied to each servo motor to achieve synchronous operation;

wherein positioning command data corresponding to the prepared moving pattern is supplied to the servo control unit corresponding to each shaft thereby to synchronously control the designated servo motors, whereby the servo motors can be freely changed from a non-synchronized condition to a synchronized condition.

* * * * *